(12) United States Patent
Backholm et al.

(10) Patent No.: US 10,089,376 B2
(45) Date of Patent: *Oct. 2, 2018

(54) DATABASE SYNCHRONIZATION VIA A MOBILE NETWORK

(71) Applicant: Seven Networks, LLC, Marshall, TX (US)

(72) Inventors: Ari Backholm, Los Altos, CA (US); Seppo Salorinne, Helsinki (FI); Heikki Ylinen, Espoo (FI); Marcus Groeber, San Carlos, CA (US); Lauri Vuornos, Helsinki (FI); Rauli Ikonen, Espoo (FI); Jukka Ahonen, Espoo (FI); Andrew Everitt, Cambridge (GB); Allan McLeod, Cambridgeshire (GB); Petri Salmi, Espoo (FI)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,277

(22) Filed: Aug. 30, 2016

(65) Prior Publication Data

US 2016/0371359 A1 Dec. 22, 2016

Related U.S. Application Data

(63) Continuation of application No. 14/145,843, filed on Dec. 31, 2013, now Pat. No. 9,460,104, which is a (Continued)

(30) Foreign Application Priority Data

Dec. 29, 2004 (FI) ...................................... 20045508

(51) Int. Cl.
*G06F 17/30* (2006.01)
*G06Q 10/10* (2012.01)
*H04L 29/06* (2006.01)

(52) U.S. Cl.
CPC .. *G06F 17/30581* (2013.01); *G06F 17/30174* (2013.01); *G06F 17/30575* (2013.01);
(Continued)

(58) Field of Classification Search
CPC ................................................ G06F 17/30569
See application file for complete search history.

(56) References Cited

U.S. PATENT DOCUMENTS 4,831,582 A 5/1989 Miller et al.
4,875,159 A 10/1989 Cary et al.
(Continued)

FOREIGN PATENT DOCUMENTS

WO WO2003098890 A1 11/2003
WO WO2004071049 A1 8/2004

OTHER PUBLICATIONS

ETSI, Universal Mobile Telecommunications System (UMTS); Telecommunications Management, Charging management; Charging data description for the Packet Switched (PS) domain (3GPP TS 32.215 version 4.7.0 Release 5), ETSI TS 132 215 V5.7.0 (Sep. 2004), pp. 0-68.
(Continued)

*Primary Examiner* — Kim T Nguyen
(74) *Attorney, Agent, or Firm* — NK Patent Law

(57) ABSTRACT

An apparatus adapted to operate as an A party in a database synchronization with a B party via a mobile communication network. The database contains data items to be synchronized. The apparatus includes mechanisms for maintaining a copy of the database and a client-server communication module with a client part and a server part. The client part
(Continued)

is configured to communicate via the mobile communication network with the server part of the B party. The apparatus also includes change detection mechanisms responsive to a detection of a changed data item, for initiating a synchronization event via the client part of the client-server communication module.

14 Claims, 4 Drawing Sheets

Related U.S. Application Data continuation of application No. 11/318,487, filed on Dec. 28, 2005, now Pat. No. 8,620,858.

(60) Provisional application No. 60/650,976, filed on Feb. 9, 2005.

(52) U.S. Cl.
CPC ..... *G06F 17/30902* (2013.01); *G06Q 10/109* (2013.01); *G06Q 10/1095* (2013.01); *H04L 67/42* (2013.01)

(56) References Cited

U.S. PATENT DOCUMENTS

| | | | |
|---|---|---|---|
| 4,897,781 A | 1/1990 | Chang et al. |
| 5,263,157 A | 11/1993 | Janis |
| 5,386,564 A | 1/1995 | Shearer et al. |
| 5,392,390 A | 2/1995 | Crozier |
| 5,581,749 A | 12/1996 | Hossain et al. |
| 5,600,834 A | 2/1997 | Howard |
| 5,623,601 A | 4/1997 | Vu |
| 5,627,658 A | 5/1997 | Connors et al. |
| 5,630,081 A | 5/1997 | Rybicki et al. |
| 5,634,053 A | 5/1997 | Noble et al. |
| 5,647,002 A | 7/1997 | Brunson |
| 5,652,884 A | 7/1997 | Palevich |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,701,423 A | 12/1997 | Crozier |
| 5,704,029 A | 12/1997 | Wright, Jr. |
| 5,706,502 A | 1/1998 | Foley et al. |
| 5,710,918 A | 1/1998 | Lagarde et al. |
| 5,713,019 A | 1/1998 | Keaten |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,735 A | 3/1998 | Meyering |
| 5,745,360 A | 4/1998 | Leone et al. |
| 5,752,246 A | 5/1998 | Rogers et al. |
| 5,757,916 A | 5/1998 | MacDoran et al. |
| 5,758,150 A | 5/1998 | Bell et al. |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,787,441 A | 7/1998 | Beckhardt |
| 5,790,425 A | 8/1998 | Wagle |
| 5,799,318 A | 8/1998 | Cardinal et al. |
| 5,806,074 A | 9/1998 | Souder et al. |
| 5,832,483 A | 11/1998 | Barker |
| 5,857,201 A | 1/1999 | Wright, Jr. et al. |
| 5,870,759 A | 2/1999 | Bauer et al. |
| 5,909,689 A | 6/1999 | Van Ryzin |
| 5,924,096 A | 7/1999 | Draper et al. |
| 5,943,676 A | 8/1999 | Boothby |
| 5,961,590 A | 10/1999 | Mendez et al. |
| 5,968,131 A | 10/1999 | Mendez et al. |
| 5,978,933 A | 11/1999 | Wyld et al. |
| 6,006,274 A | 12/1999 | Hawkins et al. |
| 6,023,708 A | 2/2000 | Mendez et al. |
| 6,044,381 A | 3/2000 | Boothby et al. |
| 6,081,806 A | 6/2000 | Chang et al. |
| 6,085,192 A | 7/2000 | Mendez et al. |
| 6,131,096 A | 10/2000 | Ng et al. |
| 6,131,116 A | 10/2000 | Riggins et al. |
| 6,138,124 A | 10/2000 | Beckhardt |
| 6,141,664 A | 10/2000 | Boothby |
| 6,151,606 A | 11/2000 | Mendez |
| 6,173,312 B1 | 1/2001 | Atarashi et al. |
| 6,212,529 B1 | 4/2001 | Boothby et al. |
| 6,223,187 B1 | 4/2001 | Boothby et al. |
| 6,233,341 B1 | 5/2001 | Riggins |
| 6,243,705 B1 | 6/2001 | Kucala |
| 6,324,542 B1 | 11/2001 | Wright, Jr. et al. |
| 6,487,560 B1 | 11/2002 | LaRue et al. |
| 6,493,727 B1 | 12/2002 | Huang et al. |
| 6,516,314 B1 | 2/2003 | Birkler et al. |
| 6,694,335 B1 | 2/2004 | Hopmann et al. |
| 6,708,221 B1 | 3/2004 | Mendez et al. |
| 6,799,190 B1 | 9/2004 | Boothby |
| 6,925,477 B1* | 8/2005 | Champagne ...... G06F 17/30569 707/610 |
| 7,346,616 B2 | 3/2008 | Ramanujam et al. |
| 7,430,609 B2 | 9/2008 | Brown et al. |
| 2002/0055351 A1* | 5/2002 | Elsey ................... G06Q 10/109 455/414.2 |
| 2002/0069298 A1 | 6/2002 | Birkler et al. |
| 2002/0099727 A1* | 7/2002 | Kadyk ................... G06F 9/542 |
| 2003/0078880 A1 | 4/2003 | Alley et al. |
| 2003/0172070 A1 | 9/2003 | Sawadsky et al. |
| 2004/0006551 A1 | 1/2004 | Sahinoja et al. |
| 2004/0010510 A1 | 1/2004 | Hotti |
| 2004/0024795 A1 | 2/2004 | Hind et al. |
| 2004/0139235 A1 | 7/2004 | Rashid et al. |
| 2004/0147262 A1 | 7/2004 | Lescuyer et al. |
| 2004/0176128 A1 | 9/2004 | Grabelsky et al. |
| 2004/0190688 A1* | 9/2004 | Timmins ............. H04M 3/4878 379/88.02 |
| 2004/0230619 A1 | 11/2004 | Blanco et al. |
| 2004/0249857 A1* | 12/2004 | Gauweiler ........ G06F 17/30893 |
| 2004/0255137 A1* | 12/2004 | Ying ................... H04L 63/0442 713/193 |
| 2004/0260761 A1 | 12/2004 | Leaute et al. |
| 2004/0266441 A1* | 12/2004 | Sinha ...................... H04L 51/14 455/445 |
| 2005/0005259 A1* | 1/2005 | Avery ................... G06F 9/5038 717/103 |
| 2005/0015432 A1 | 1/2005 | Cohen |
| 2005/0015436 A1* | 1/2005 | Singh ................ G06F 17/30575 709/203 |
| 2005/0028165 A1* | 2/2005 | McGowan .......... G06F 9/44505 719/310 |
| 2005/0071194 A1 | 3/2005 | Bormann et al. |
| 2005/0086540 A1* | 4/2005 | Gunter ................... G06F 21/33 726/4 |
| 2005/0099963 A1 | 5/2005 | Multer et al. |
| 2005/0278641 A1* | 12/2005 | Mansour ............. G06Q 10/109 715/749 |
| 2006/0036580 A1 | 2/2006 | Stata et al. |
| 2006/0048061 A1* | 3/2006 | Forlenza ............. G06Q 10/107 715/751 |
| 2006/0063544 A1 | 3/2006 | Zhao et al. |
| 2006/0149970 A1 | 7/2006 | Imazu |
| 2006/0200583 A1 | 9/2006 | Le Lann et al. |

OTHER PUBLICATIONS

ETSI, Universal Mobile Telecommunications System (UMTS); Telecommunications Management, Charging and billing; 3G call and event data for the Packet Switched (PS) domain (3GPP TS 32.015 version 3.12.0 Release 1999), ETSI TS 132 015 V3.12.0 (Dec. 2003), pp. 0-66.

ETSI, Digital cellular telecommunications system (Phase 2+); Universal Mobile Telecommunications System (UMTS); General Packet Radio Service (GPRS); GPRS Tunnelling Protocol (GTP) across the

(56) References Cited

OTHER PUBLICATIONS

Gn and Gp interface (3GPP TS 29.060 version 5.11.0 Release 5), ETSI TS 129 060 V5.11.0 (Sep. 2004), pp. 0-95.

* cited by examiner

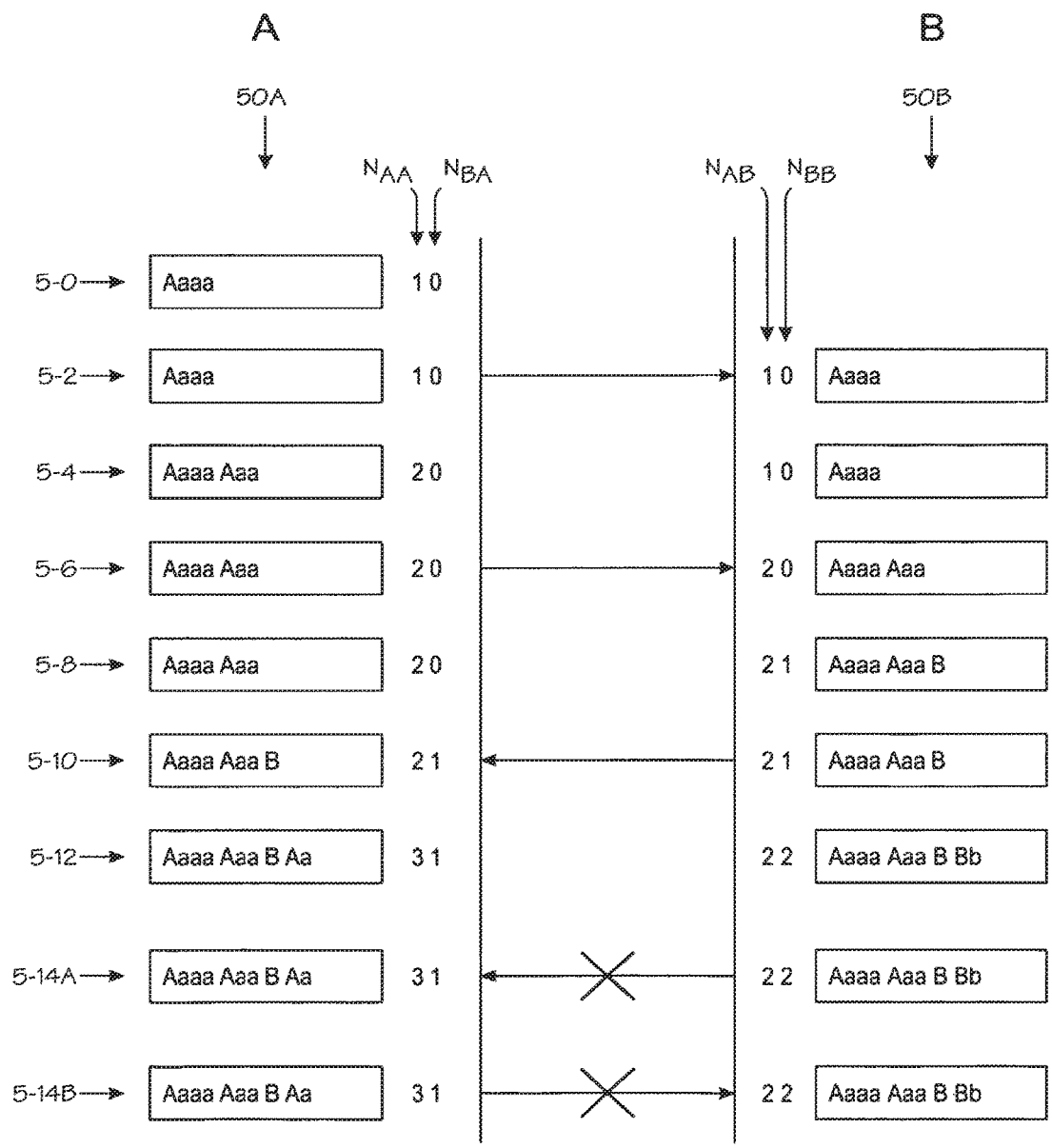

DATABASE SYNCHRONIZATION VIA A MOBILE NETWORK

This is non-provisional application, which claims priority to U.S. patent application Ser. No. 14/145,843 filed on Dec. 31, 2013, which claims priority to U.S. patent application Ser. No. 11/318,487 filed on Dec. 28, 2005, which relies for priority upon U.S. Provisional Application No. 60/650,976, filed Feb. 5, 2005, and Finnish Patent Application No. 20045508, filed Dec. 29, 2004, the contents of all of which are incorporated herein by reference in their entireties.

BACKGROUND OF THE INVENTION

The invention relates to methods and equipment for synchronizing a database between two parties via a mobile network. In a very common but non-restricting application, one party is a desktop computer, while the other one is a portable computer, a pocket computer or a "smart" telephone. The database contains data items, such as documents, calendar events, meeting requests, address book entries or the like that can be changed at either party. As commonly used in the context of databases, synchronization means reducing or eliminating differences between the database copies maintained at the parties, which are supposedly similar but at least one database contains changed data items which are not reflected in the other database.

Prior art database synchronization techniques via a mobile network are developed for a circuit-switched networks, or they attempt to simulate circuit-switched operation by means of sessions. In a session-based database synchronization, a session is established between the two parties, differences between the database copies are detected and eliminated by transmitting differing data items between the parties, after which the session is closed. In many mobile applications, database synchronization between a mobile terminal and an office computer takes place when the mobile terminal is inserted in a cradle that, in addition to the database synchronization, may load the mobile terminal's battery.

Such prior art database synchronization techniques are suitable for applications that are not time-critical, i.e., applications that tolerate long periods of time between synchronization sessions. If session-based synchronization techniques are used for time-critical databases that have to be synchronized frequently, a major problem is the signalling overhead caused by the session establishment. In time-critical applications, a synchronization session is frequently established merely for detecting potential differences between the database copies, and if no differences are detected, the session is closed without actually transferring any data items between the parties. The overhead is a particular problem in mobile applications in which data transfer is expensive, even if it is only overhead data. Any superfluous traffic also loads the mobile terminal's battery.

BRIEF DESCRIPTION OF THE INVENTION

An object of the present invention is to provide a method and an apparatus for implementing the method so as to alleviate the above disadvantages. The object of the invention is achieved by the methods and equipment which are defined in the independent claims. The preferred embodiments of the invention are disclosed in the dependent claims.

An aspect of the invention is a method for synchronizing a database between an A party and a B party, wherein the parties communicate via a mobile communication network and the database contains data items to be synchronized. Each party comprises a client part and a server part of a client-server communication module. The client part of the client-server communication module of a party communicates via the mobile communication network with the server part of the client-server communication module of the other party. Each party maintains a respective copy of the database. In response to generating a changed data item, the party having generated the changed data item initiates a synchronization event via the client part of its client-server communication module.

Another aspect of the invention is an apparatus adapted to act as one of the parties in the method. Yet another aspect of the invention is a computer program product that causes a data processor to carry out the method when the program product is executed.

An advantage of the invention is a reduced overhead compared with session-based synchronization techniques. The overhead reduction is beneficial in push-type applications.

BRIEF DESCRIPTION OF THE DRAWINGS

In the following the invention will be described in greater detail by means of preferred embodiments with reference to the attached drawings, in which

FIG. 5 illustrates an embodiment that makes use of change counts for improving the robustness of database synchronization still further.

DETAILED DESCRIPTION OF EMBODIMENTS OF THE INVENTION

Figure 1:
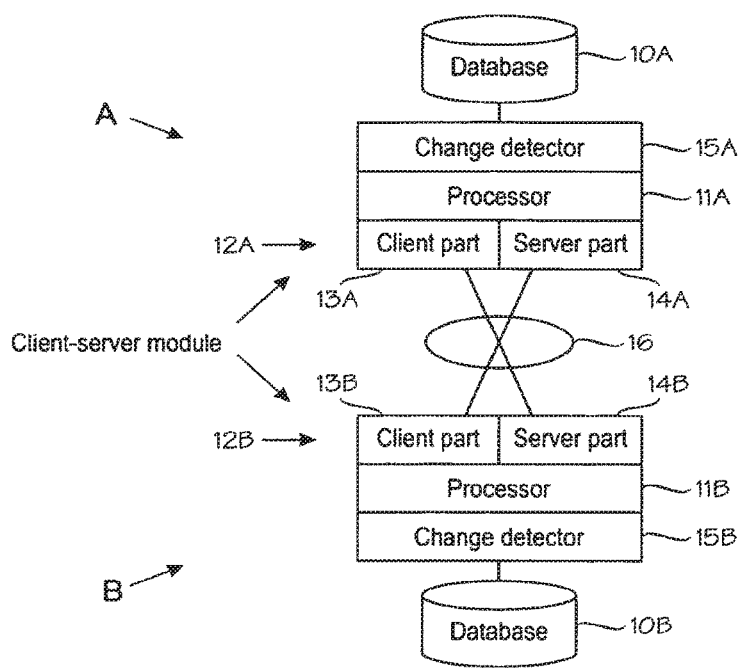
FIG. 1 illustrates synchronization of two databases, each of which has an associated processor and a client-server communication module.

FIG. 1 illustrates synchronization of two databases 10A and 10B. Since the arrangement is symmetrical, only the A side will be described. The database 10A has an associated processor 11A. The processor interfaces to the and a client-server communication module 12A. The client-server communication module 12A comprises two parts, namely a client part 13A and a server part 14A. The client part 13A of the A side communicates with the server part 14B of the B side via a mobile communication network 16. The server part 14A of the A side communicates with the client part 13B of the B side via the mobile communication network 16.

Database synchronization in the present invention is event-based, which is why there is a change detection logic or layer 15A logically between the processor 11A and the database 10A. This means that if one application, such as a calendar application, changes a data item in the database 10A, the change detection logic 15A detects this change and signals it to the client-server communication module 12A.

As is common in client-server technology, a client does not store a copy of all the data in the server but only a view to that data, and the view typically contains only a subset of the data in the server. The invention differs from conventional use of client-server technology in that each of the two databases is associated with a processor and a client-server communication module, wherein each party's client part communicates with the server part of the other party and vice versa. Thus each of the two parties A and B only store a view to the data in the other party, but unlike session-based synchronization mechanisms, in which differences between the two databases are assessed and eliminated (by copying differing data items both ways), the present invention tolerates situations in which the databases 10A and 10B will never be perfectly identical in content. This is useful in, say, calendar applications in which a person's office computer may store several years' worth of calendar events in the past, while the user has deleted past events from his/her mobile terminal, in order to save its memory. The office computer may also store more data fields per calendar event. Because the database synchronization of the present invention is based on detection of events that change data items, instead of wholesale comparison between the databases, data items which the user has deleted from the mobile database need not be deleted from the office database.

In terms of hardware, FIG. 1 is greatly simplified. A skilled reader will understand that the processor blocks 11A, 11B contain all the hardware in a terminal according to the invention, including memory; the databases 10A, 10B are logical data structures in the processor's memory, and the communication modules 12A, 12B and the change detection logics 15A, 15B are software routines executed in the processors.

FIG. 1 illustrates the invention as an arrangement of hardware and software blocks. The inventive idea can be expressed in an alternative manner by saying that the invention combines notification and synchronization protocols. In some prior art synchronization techniques, a party changing a data item sends the other party a notification message indicating that a change has been made, after which the parties may then set up a synchronization session, if the user deems it appropriate. In the present invention, the notification and synchronization protocols are combined, which means that the notification message also carries the data item to be synchronized.

Figure 2:
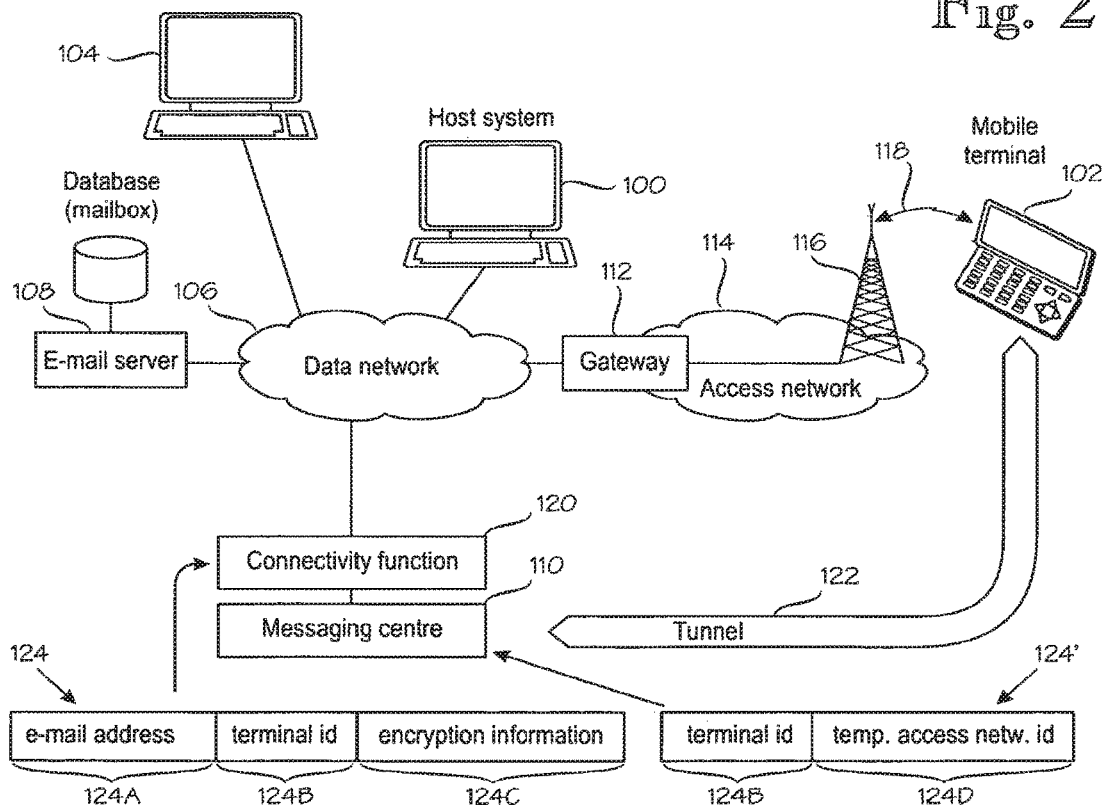
FIG. 2 shows an exemplary system architecture in which the invention can be used.

FIG. 2 shows an implementation of a mobile e-mail system in which the invention can be used. E-mail messages as such are not particularly good candidates for data items to be synchronized because e-mail messages are typically not updated in response to a change made by the other party. But some e-mail systems relay control messages that change status of e-mail messages. Examples of such control messages include "mark e-mail message with ID xxx read/unread", "delete e-mail message with ID xxx", "move e-mail message with ID xxx to folder yyy", or the like. Such control messages can be processed similarly to data items to be synchronized. Furthermore, many commercial e-mail application packages also contain or support calendar applications which do process data items to be synchronized, such as calendar events, meeting requests, address book entries or the like. Thus the following description uses the term 'e-mail system' in a broad sense.

The invention is applicable to virtually any mobile e-mail system architecture. FIG. 2 shows an exemplary system architecture which is supported by the owner of the present application. Reference numeral 100 denotes a host system that is able to send an receive e-mail messages. Reference numeral 102 denotes a mobile terminal, also able to send and receive e-mail messages. The e-mail messages may originate or terminate at external e-mail terminals, one of which is denoted by reference numeral 104. The invention aims at improving cooperation between the host system 100 and mobile terminal 102 such that they can use a single e-mail account as transparently as possible. This means, for example, that the users of the external e-mail terminals 104, when sending or receiving e-mail, do not need to know if the user of the host system 100 actually uses the host system 100 or the mobile terminal 102 to communicate via e-mail. The transparency also means that e-mail manipulation at the mobile terminal 102 has, as far as possible, the same effect as the corresponding e-mail manipulation at the host system 100. For example, e-mail messages read at the mobile terminal 102 should preferably be marked as read at the host system.

Reference numeral 106 denotes a data network, such as an IP (Internet Protocol) network, which may be the common Internet or its closed subnetworks, commonly called intranets or extranets. Reference numeral 108 denotes an e-mail server and its associated database. There may be separate e-mail servers and/or server addresses for incoming and outgoing e-mail. The database stores an e-mail account, addressable by means of an e-mail address, that appears as a mailbox to the owner of the e-mail account. In order to communicate with mobile terminals 102, the data network 106 is connected, via a gateway 112 to an access network 114. The access network comprises a set of base stations 116 to provide wireless coverage over a wireless interface 118 to the mobile terminals 102.

Reference numeral 110 denotes a messaging centre that is largely responsible for providing the above-mentioned transparency between the host system 100 and the mobile terminal 102. The system architecture also comprises a connectivity function 120, whose task is to push e-mail messages to the mobile terminal. In the embodiment shown in FIG. 2, the connectivity function 120 is considered a physically integral but logically distinct element of the messaging centre 110.

The mobile terminal 102 may be a pocket or laptop computer with a radio interface, a smart cellular telephone, or the like. Depending on implementation, the host system 100, if present, may have different roles. In some implementations the host system 100 is optional and may be a conventional office computer that merely acts as the mobile terminal user's principal computer and e-mail terminal. In other implementations the host system may act as a platform for a single user's connectivity function, in addition to being an office computer. In yet other implementations the host system 100 may comprise the connectivity function for several users. Thus it is a server instead of a normal office computer.

We assume here that the access network 114 is able to establish and maintain a tunnel 122 between the messaging centre 110 and the mobile terminal 102. For instance, the tunnel may be set up using GPRS Tunneling Protocol (GTP) or its later derivatives, or any other suitable tunneling protocol.

FIG. 2 shows an embodiment in which the messaging centre 110 is largely responsible for e-mail transport to/from the mobile terminal 102 via the access network 114, while a separate connectivity function 120 is responsible for data security issues. The connectivity function 120 may be physically attached to or co-located with the messaging centre 110, but they are logically separate elements. Indeed, a definite advantage of the separate connectivity function 120 is that it can be detached from the messaging centre, for instance, within the company that owns the host system 100 or the e-mail server 108. For a small number of users, the connectivity function 120 can be installed in each host system 100, or the host system 100 can be interpreted as a separate server configured to support multiple users. It is even possible to implement some or all the above-mentioned options. This means, for example, that there is one or more messaging centres 110 that offer services to several network operators, or they may be a dedicated messaging centre for each network operator (somewhat analogous to short messaging centres). Each messaging centre 110 may have an integral connectivity function 120 to support users who don't wish to install a separate connectivity function in a host system 100. For users who do install a separate connectivity function 120 in their host systems 100, such connectivity functions bypass the connectivity function in the messaging centre 110 and address the messaging centre 110 directly.

A real e-mail system supports a large number of mobile terminals 102 and tunnels 122. In order to keep track of which e-mail account and which tunnel belongs to which mobile terminal, the messaging centre 110 and the connectivity function collectively maintain an association 124, 124' for each supported mobile terminal. Basically, each association 124, 124' joins three fields, namely an e-mail address 124A assigned to the mobile terminal or its user, encryption information 124C and a temporary wireless identity 124D of the mobile terminal in the access network. The embodiment shown in FIG. 2 also employs a terminal identifier 124B which may be the same as the e-mail address 124A of the mobile terminal 102, in which case the association 124 actually associates three information items. Alternatively, the terminal identifier 124B may be an identifier arbitrarily assigned to the mobile terminal. In a preferred implementation the terminal identifier 124B is the mobile terminal's equipment identifier or its derivative. The encryption information 124C is preferably related to the mobile terminal's equipment identity and is preferably generated by the mobile terminal itself, so as to ensure that no other terminal besides the one used for creating the encryption information 124C will be able to decrypt incoming encrypted e-mail messages. The temporary wireless identity 124D may be the identifier of the tunnel 122 to the mobile station. Of course, the tunnel identifier is not permanent and is only known when a tunnel exists.

The elements shown in FIG. 1 can be mapped to the architecture shown in FIG. 2 as follows. All elements of one party, say B, are implemented in the mobile terminal 102, while the remaining party, say A, is implemented such that the client-server module 12B is located in the connectivity function 120 and the database 10B and change detector 15B are located in the e-mail server 108. Alternatively, the change detector 15B can be installed in the host system 100 that executes the applications that change the data items.

Figure 3:
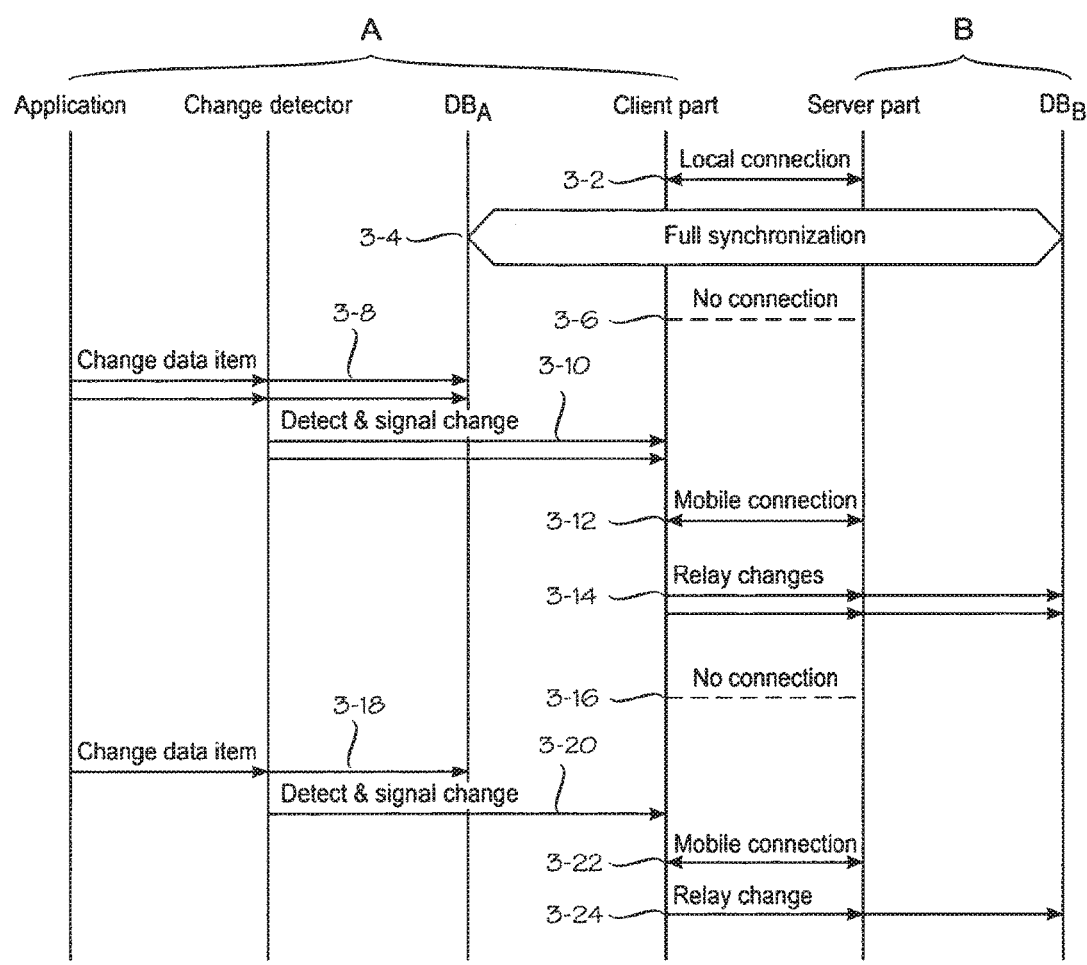
FIG. 3 shows a hypothetical set of events in a system as shown in FIG. 2.

FIG. 3 is a signalling diagram illustrating database synchronization in an embodiment of the invention. FIG. 3 shows two parties A and B. Each party comprises an associated database, denoted by DBA and DBB, respectively. Both parties comprise an application, such as a calendar application, an change detector and a client part and a server part of a client-server communication module. For reasons of clarity, the elements not participating in any events are omitted from FIG. 3.

Steps 3-2 through 3-6 are optional and relate to a full synchronization via a local connection. In step 3-2 a local connection is established between the two parties A and B. For instance, the two parties may be a mobile terminal and an office computer which are able to communicate via a local interface, such as a short-range radio interface or a docking station. In step 3-4 a full synchronization is performed between the two databases. Full synchronization does not necessarily mean that the databases DBA and DBB are made fully identical. Instead, as is well known in mobile applications, a mobile station may store calendar events from a restricted period of time and fewer data fields per calendar event than the office computer does. Thus the full synchronization may mean detection and elimination of differences between the ranges and fields to be synchronized in the two databases. In step 3-6 the local connection is disconnected.

FIG. 3 shows a scenario in which steps 3-8 and 3-10 take place when there is neither local nor mobile connection between the parties A and B. In step 3-8 an application executing in the A party changes a data item in the database DBA. For example, a calendar application may change a calendar event or meeting request. In step 3-10 the change detector detects the change and signals it to the client part of the A party. Steps 3-8 and 3-10 are shown with multiple arrows, which means that any number of data base changes can take place while the connection between the parties A and B is interrupted. In step 3-12 a mobile connection between the parties A and B is set up. In step 3-14 the client part of the A party relays the accumulated data item changes to the server part of the B party, which makes the corresponding changes to the database DBB of the B party. Before relaying the changes to the B party, the changes may be packed to conserve resources and/or encrypted to improve data security.

In step 3-16 the mobile connection is interrupted. In step 3-18 the application again changes a data item. In step 3-20, the change detector detects the change and signals it to the client part of the A party, which has to buffer the change notification while the inter-party communication is interrupted. Instead of buffering change notifications in the client part of the A party, the change notifications may be buffered in an intervening network elements, such as the messaging centre 110 shown in FIG. 2. In step 3-22 the inter-party connection is restored, and in step 3-24 the client part of the A party can notify the change to the server part of the B party.

It is to be noted that the full synchronization in step 3-4 is optional and is shown primarily to clarify how the present invention differs from conventional synchronization protocols. The actual invention relates to steps that take place after the full synchronization. It is apparent from the scenario shown in FIG. 3 that a database synchronization according to the invention tolerates connection interruptions between the parties. After the interruption and re-establishment of the inter-party connection in steps 3-16 and 3-22, the synchronization according to the invention can proceed without beginning from scratch. Further embodiments for improving the robustness of the technique still further will be described in connection with FIG. 5.

Figure 4:
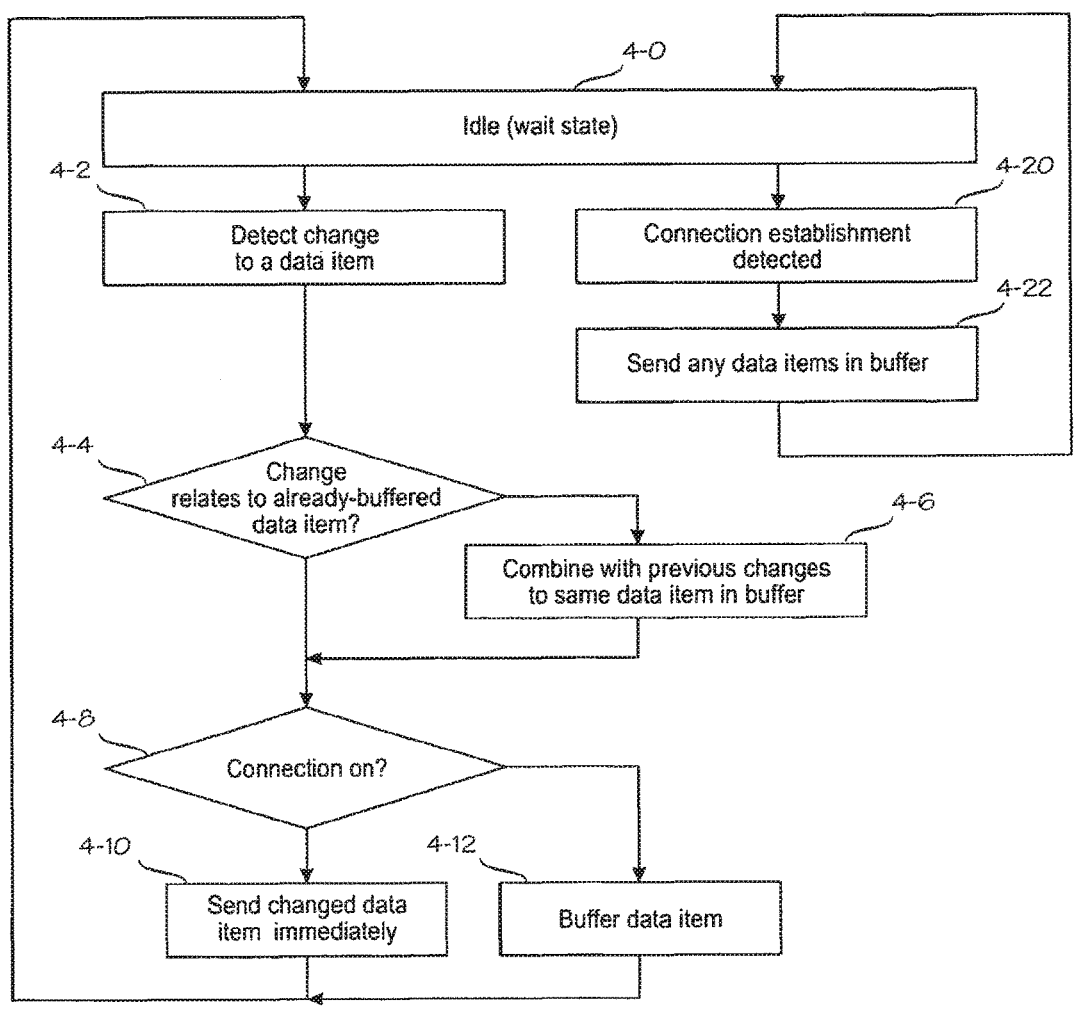
FIG. 4 is a flowchart for an embodiment that improves the robustness of database synchronization against communication interruptions.

FIG. 4 is a flowchart for an embodiment that improves the robustness of database synchronization against communication interruptions. The flow chart describes a process executed in the client part of a client-server communication module. Reference numeral 4-0 denotes an idle or wait state in which the client part has nothing to send. The idle states comprises two exit mechanisms, denoted by reference numerals 4-2 and 4-20. In step 4-2 a change to a data item is detected. Steps 4-4 and 4-6 are optional and will be described shortly. In step 4-8 the existence of an inter-party connection is tested. If the connection is on, the changed data item is sent to the other party immediately in step 4-10, after which the process returns to the idle state 4-0. If the inter-party connection is not on, the data item is stored in a buffer in step 4-12. As an alternative to buffering the changed data item itself, it is possible to buffer an indication of the changed data item, and the actual data item can be retrieved from the database when the connection is re-established.

In step 4-20 a connection re-establishment between the parties is detected. In step 4-22 any buffered data items are sent to the other party, and the process returns to the idle state 4-0. On the network side, such buffering may be implemented in the connectivity function 120 or messaging centre 110, for example.

An optional step 4-4 comprises testing whether the change to a data item relates to a data item that is already stored in the buffer. If yes, in step 4-6 the most recent change is combined with the previous changes to the same data item in the buffer. Such combination may be based on type of the data item and/or the nature of the change. In many cases, a more recent change can simply override earlier changes to the same data item. For example, the data items may be control messages of an e-mail application. If the previous control message was "move e-mail message xxx to folder yyy" and the most recent control message is "delete e-mail message xxx", it is apparent that only the most recent control message has to be deleted. Likewise, the most recent change to a calendar event can simply override earlier changes to the same calendar event in the buffer.

A process shown in FIG. 4 tolerates connection interruptions between synchronization events. When the inter-party connection is re-established, any buffered data item changes are simply sent to the to the other party. There are two types of situations that may be problematic for a process shown in FIG. 4. This process may be insufficient to cope with connection interruptions during a synchronization event, ie, a transmission of a changed data item. Another problematic situation is one in which both parties change their instances of the same data item when the inter-party connection is interrupted. FIG. 5 shows a still more robust synchronization mechanism that aims to solve such problems.

FIG. 5 illustrates an embodiment that makes use of change counts for improving the robustness of database synchronization still further. Robustness is a desirable feature, particularly in mobile applications in which inter-party communication may be disrupted.

This embodiment is based on the idea that each party maintains two change counts per data item. A first change count keeps track of changes to the data item by the party itself, while the second change count keeps track of changes to the data item by its peer, ie, the other party. At each synchronization event, either party sends its peer the data items it has changed after the previous synchronization event plus the two change counts. The sent change counts tell the other party how many changes the party has made and how many peer changes the party is aware of. Either party detects a conflict if the count of changes by the party, as maintained by its peer, differs from the corresponding change count as maintained by the party itself. Such a difference in change counts serves as an indication that the data item received from the peer did not reflect all changes made by the party that detects the conflict.

In a variant of the above inventive idea, each party may send its peer an identifier of each data item it has changed, plus the two change counts. By comparing the received change counts with the corresponding change counts maintained locally, the parties can determine which data items have been changed after the latest synchronization, and request the transmission of the changed data items separately. The two techniques can be summarized by saying that each party sends its peer an indication of a data item it has changed, plus the two change counts. The indication may be an identifier of the data item or the data item itself.

In addition to the two change counts per party, it is beneficial to maintain some record-keeping of which data items have been changed after the latest synchronization, whereby only the changed data items need to be synchronized. For example, such a record-keeping can be based on time stamps of data items that are compared with the time of the latest synchronization. Alternatively, the record-keeping can be based on a one-bit flag, which is marked "changed" when the data item is changed and "unchanged" when the data items are synchronized.

As an alternative to the record-keeping of data items changed after the latest synchronization, the parties may send changed data items or indications thereof immediately, if this is possible. In some implementations, one application (such as a calendar application) may be responsible for changing the data items (calendar events), while a separate application (a communications application or protocol layer) is responsible for actually sending the changed data items.

An advantage of this embodiment is that synchronization of data items is possible without providing each data item with a data stamp. A further advantage is that synchronization is possible even if the parties' clocks are offset in relation to each other. This embodiment is particularly suitable in mobile applications because a party receiving a changed data item does not have to acknowledge the reception of received data item. The party sending the changed data item can determine from the next pair of change counts if its peer actually received the changed data item.

FIG. 5 shows a hypothetical set of events in a synchronization process based on a pair of change counts maintained by either party. The left-hand side of FIG. 5 relates to the A party, while the right-hand side relates to the B party. Reference numerals 50A and 50B denote copies (versions) of a data item at the A and B party, respectively.

In step 5-0 a new data item 50A, such as an electronic document or calendar event, is created at the A party. At this time the data item does not yet exist at the B party. In step 5-2 the A party detects a synchronization trigger and sends the data item 50A to the B party. The synchronization trigger may be the simultaneous existence of a changed (in this case: newly-created) data item and a data connection between the parties. Both parties maintain two change counts that relate to the data item. The change counts are denoted by the following reference signs:

$N_{AA}$, number of changes made by A, as seen by A;
$N_{BA}$, number of changes made by B, as seen by A;
$N_{AB}$, number of changes made by A, as seen by B; and
$N_{BB}$, number of changes made by B, as seen by B.

In the embodiment shown in FIG. 5, the creation of the data item is considered a change, which is why after steps 5-0 and 5-2 the change counts NAA and NAB have a value of '1'. However, the invention operates equally well if the initial creation of a data item is not considered a change and the change counts begin at zero.

In step 5-4 the A party changes the data item 50A. Synchronization does not take place immediately, possibly because a data connection between the parties does not exist. The NAA change count is '2' because A knows it has changed the data item twice. The NAB change count remains at '1' because B is not yet aware of the latest change.

In step 5-6 the data item is again synchronized. In other words, A sends to B the data item 50A and the NAA and NBA change counts. B compares the received data counts with the respective data counts NAB and NBB maintained at the B party. Since NAA='2' and NAB='1', B detects that the data item has been changed by A after the previous synchronization. B can accept the changed data item because the NBA change count equals the NBB change count (both are zeros).

In step 5-8 the B party changes its copy 50B of the data item. In the interest of clarity, the A and B parties respectively add letters 'A' and 'B', in upper or lower case, to the data item. Since this is B's first change to the data item, B also changes the NBB change count to '1'. The NBA change count remains at '0' because A is not yet aware of the change made by B.

In step 5-8 the data item is again synchronized. B sends to A the data item 50B and the NAB and NBB change counts. A compares the received data counts with the respective data counts NAA and NBA maintained at the A party. Since NBB='1' and NBA='0', the A party detects that the data item has been changed by B after the previous synchronization in step 5-6. A can accept the changed data item because the NAB change count equals the NAA change count (both have a value of '2').

In step 5-12 both parties A and B change their respective copies 50A and 50B of the data item and the change counts. The A party increments the NAA change count to '3', while B increments the NBB change count to '2'. But neither party is yet aware of the changes made by its peer.

Reference numeral 5-14A describes a situation in which B attempts to send the data item 50B to A. B also sends the NAB and NBB change counts. A compares the received data counts with the respective data counts NAA and NBA maintained at the A party. Since NBB='2' and NBA='1', A detects that the data item has been changed by B after the previous synchronization. But A cannot accept the changed data item because the received NAB change count (with a value of '2') is lower than the locally maintained NAA change count (with a value of '3'). Thus A detects a conflict if the NAB change count (count of changes made by A and known to B) is lower than the NAA change count, ie, the corresponding change count maintained by A itself. In such a situation, A detects that the data item sent by B did not include all the changes made by A, and if A accepted the data item, some of the changes made by A would be lost. The big 'X' over the arrow in step 5-14A signifies the fact that A does not accept the changed data item, at least not without some conflict resolution. For the purposes of FIG. 5, it is assumed that A rejects the data item sent by B.

Reference numeral 5-14B describes a situation in which A attempts to send the data item 50A to B. The situation is symmetrical to the previously described situation 5-14A. In this case B detects a conflict because the change count NBA (with a value of 1) received from A is lower than the corresponding change count NBB (with a value of 2) maintained by B itself. Thus B detects that the data item sent by A did not include all the changes made by B.

In the scenario shown in FIG. 5, it was assumed that in the synchronization events 5-6 and 5-10, the changed data items 50A and 50B were sent with the change counts. It is also possible to send only an identifier of a changed data item, whereby the party receiving the change counts will compare the received change counts with their locally maintained counterparts and request the actual data item only if it has been changed.

The synchronization technique preferably comprises a set of predetermined rules for conflict resolution. The applicable rules may be displayed for user selection, or they may be selected by some predetermined criteria that may, for example, be based on the type of the data item. Instead of presenting the applicable rules for user selection, the party that detects the conflict may select one of the rules automatically, preferably on the basis of the type of the data item. For example, if the data items are calendar events, it is relatively safe to assume that the newer one is to replace the older one. If the data items are word processing documents, the documents may be combined for later editing by the user.

It is readily apparent to a person skilled in the art that, as the technology advances, the inventive concept can be implemented in various ways. The invention and its embodiments are not limited to the examples described above but may vary within the scope of the claims.

What is claimed is:

1. Within a system comprising an Internet Protocol (IP) network coupled between a first computer and a second computer, a method comprising:
    establishing and maintaining a data path over the IP network between the first computer and the second computer using a tunnelling protocol;
    maintaining a first database on the first computer, the first database having an existing data item;
    maintaining a second database on the second computer, the second database having a corresponding data item that has been previously synchronized with the existing data item;
    detecting a change in the existing data item by the first computer; and
    transmitting a notification message from the first computer to the second computer over the data path, the notification message comprising:
        an indication the existing data item has changed; and
        the change in the existing data item;
    and
        updating the corresponding data item, wherein detecting the change, verifying the data path, and transmitting the notification message are executed in near real-time.

2. The method of claim 1, wherein the system is implemented within a mobile communication network.

3. The method of claim 2, wherein the first computer comprises a server.

4. The method of claim 3, wherein the second computer comprises a server.

5. The method of claim 4, wherein the IP network is an intranet.

6. The method of claim 1, further comprising verifying the data path.

7. The method of claim 1, wherein the tunneling protocol is a GPRS Tunnelling Protocol (GTP).

8. A system comprising:
    a first computer having a first database, the first database having an existing data item;
    a second computer having a second database, the second database having a corresponding data item that has been previously synchronized with the existing data item; and
    an Internet Protocol (IP) network coupled between the first computer and the second computer; wherein:
        the first computer is configured to:
            establish and maintain a data path over the IP network between the first computer and the second computer using a tunnelling protocol;
            maintain the first database;
            detect a change in the existing data item;
            and transmit a notification message to the second computer over the data path, the notification message comprising:
an indication the existing data item has changed; and
the change in the existing data item, wherein the first computer is further configured to detect the change, verify the data path, and transmit the notification message in near real-time;
and
the second computer is configured to:
receive the notification message; and
update the corresponding data item.

9. The system of claim 8, wherein the system is implemented within a mobile communication network.

10. The system of claim 9, wherein the first computer comprises a server.

11. The system of claim 10, wherein the second computer comprises a server.

12. The system of claim 11, wherein the IP network is an intranet.

13. The system of claim 8, wherein the first computer is further configured to verify the data path.

14. The system of claim 8, wherein the tunneling protocol is a GPRS Tunnelling Protocol (GTP).

* * * * *